(12) United States Patent
Choi

(10) Patent No.: US 9,182,888 B2
(45) Date of Patent: Nov. 10, 2015

(54) SYSTEM, DEVICE AND METHOD FOR PROVIDING PRESENCE INFORMATION USING AUDIO DATA

(71) Applicant: SK PLANET CO., LTD., Seoul (KR)

(72) Inventor: Jihyun Choi, Goyang-si (KR)

(73) Assignee: SK PLANET CO., LTD., Seoul (KR)

( * ) Notice: Subject to any disclaimer, the term of this patent is extended or adjusted under 35 U.S.C. 154(b) by 40 days.

(21) Appl. No.: 14/129,470

(22) PCT Filed: Jun. 10, 2013

(86) PCT No.: PCT/KR2013/005088

§ 371 (c)(1),
(2) Date: Dec. 26, 2013

(87) PCT Pub. No.: WO2014/133227

PCT Pub. Date: Sep. 4, 2014

(65) Prior Publication Data

US 2014/0287799 A1    Sep. 25, 2014

(30) Foreign Application Priority Data

Feb. 26, 2013    (KR) .................. 10-2013-0020769

(51) Int. Cl.
*G06F 3/0482* (2013.01)
*G06F 3/16* (2006.01)
*H04M 1/725* (2006.01)

(52) U.S. Cl.
CPC .............. *G06F 3/0482* (2013.01); *G06F 3/167* (2013.01); *H04M 1/72547* (2013.01); *H04M 2250/22* (2013.01)

(58) Field of Classification Search
CPC ................................................ G06Q 30/0251

USPC .............................. 455/73, 556.1, 556.2, 566
See application file for complete search history.

(56) References Cited

U.S. PATENT DOCUMENTS 7,373,209 B2 * 5/2008 Tagawa et al. .................. 700/94
8,185,164 B2 * 5/2012 Kim .............................. 455/566
8,849,252 B2 * 9/2014 Park et al. .................. 455/412.1

FOREIGN PATENT DOCUMENTS

JP    2003116165 A    4/2003
JP    2006191608 A    7/2006
(Continued)

OTHER PUBLICATIONS

International Search Report for application No. PCT/KR2012/005088 dated Jan. 3, 2013.
(Continued)

*Primary Examiner* — Tuan H Nguyen
(74) *Attorney, Agent, or Firm* — Hauptman Ham, LLP

(57) ABSTRACT

This invention relates to a system, device, and method for providing presence information using audio data. This invention provides a terminal device that displays a user list when predetermined input information is detected, receives, from a service device, presence information and audio information associated with the presence information of other user selected from the displayed user list, and controls an output unit, when the received presence information and audio information are displayed through the output unit, to implement audio data contained in the audio information. Accordingly, this invention can provide the users with the presence information intuitively by using audio data, and the users can gain a new user experience (UX), wherein the users can intuitively perceive the presence information via audio instead of text, that may boost the use of application for providing service exploiting the presence information.

25 Claims, 9 Drawing Sheets

(56) References Cited

FOREIGN PATENT DOCUMENTS

| | | |
|---|---|---|
| JP | 2009177352 A | 8/2009 |
| KR | 1020060080373 A | 7/2006 |
| KR | 1020070005848 A | 1/2007 |
| KR | 1020110019855 A | 3/2011 |
| KR | 1020110068237 A | 6/2011 |

OTHER PUBLICATIONS

Korean Office Action for application No. 10-2013-0020769 dated Jun. 18, 2013.

Korean Notice of Allowance for application No. 10-2013-0020769 dated Nov. 22, 2013.

* cited by examiner

SYSTEM, DEVICE AND METHOD FOR PROVIDING PRESENCE INFORMATION USING AUDIO DATA

TECHNICAL FIELD

The present invention relates generally to a system, device and method for providing presence information and more specifically to a system, device and method for providing presence information using audio data in response to specific input information.

BACKGROUND ART

With a remarkable growth of related technologies, a great variety of mobile electronic devices are increasingly popularized in these days. Particularly, mobile devices today outgrow their respective traditional fields and hence reach a mobile convergence stage.

Representatively, mobile communication devices are equipped with a variety of functions such as a TV watching function (e.g., DMB (Digital Multimedia Broadcasting) or DVB (Digital Video Broadcasting)), a music playback function (e.g., MP3 (MPEC Audio Layer-3)), a digital camera function, and an internet access function in addition to general communication functions such as voice calling and text messaging.

Additionally, recent mobile communication devices are providing a rich choice of features for convenience and entertainment, as they evolve into so called smart-phones, whereby users can install a variety of user functions at their discretion based on an open source OS. Due to vitalization of the open source market, the current smart-phones may not only provide the multi-functional applications for users, but also allow the users to conduct as many functions of PC as possible, along with a development of high-performance smart-phones.

While a variety of services and applications are available for smart-phones, one of the most commonly used services would be messaging service for exchanging messages among users, such as short messaging service (SMS), multimedia messaging service (MMS), instant messenger, and mobile messenger and so on.

As such a messaging service may be more cost-effective than a calling service and allow users to convey their messages or intentions in simpler way than direct phone calls, this messaging service has shown ever-increasing use and grown, these days, into a unified messaging service integrating the independently served messaging service of various sorts and allowing users to take advantage of diverse add-on features such as file transfer, content sharing, and the like.

In addition, the messaging service offers a presence service. The presence service is intended to provide the users concerned with indication about the current connection of a specific user's terminal device, that is, log-on or log-off state. Unfortunately, this conventional presence service is just provided in the form of simple texting.

DETAILED DESCRIPTION OF THE INVENTION

Technical Problems

The present invention is to solve the above conventional problems and, more particularly, to provide users with a system, device and method for providing presence information more intuitively, including a control unit configured to control displaying of a user list on a certain spot of the current screen or on other screen in response to signals transmitted from an input unit of a terminal device in response to a detection of the predetermined user input, and to receive, from a service device, presence information and audio data to express the presence information of the other user selected from the user list, and to control output through an output unit.

Technical Solutions

To achieve the above-mentioned purpose, a terminal device in accordance with a preferred embodiment of the present invention provides presence information by communicating with a service device. The terminal device includes a communication unit configured to send and receive messages in association with presence information to and from the service device; an output unit configured to output at least one of auditory information and visual information; and a control unit, which is functionally connected with the communication unit and the output unit, configured to control the output unit to display a user list when predetermined input information is detected from a screen of an instant messaging program. In the terminal device, the user list contains specific information about at least one of other users, and the specific information includes profile information to identify the other user, presence information to indicate a current state of the other user, and audio information to define audio data in association with the presence information.

In the terminal device in accordance with a preferred embodiment of the present invention, when one of other users is selected from the user list, the control unit is further configured to control the output unit to output audio data defined in association with the present information of the selected other user.

In the terminal device in accordance with a preferred embodiment of the present invention, the predetermined input information is information about a swipe input in a certain direction or information about a shake input entered through a shake menu or on a chatting screen.

In the terminal device in accordance with a preferred embodiment of the present invention, the user list contains all or part of other users stored in an address book.

In the terminal device in accordance with a preferred embodiment of the present invention, the profile information includes at least one of name, contact information, photo, and email address of the other user.

In the terminal device in accordance with a preferred embodiment of the present invention, the control unit is further configured to control the communication unit to receive, from the service device, the presence information and the audio information.

In the terminal device in accordance with a preferred embodiment of the present invention, the control unit is further configured to control the output unit to display the user list on a certain spot of a current screen or on other screen.

In the terminal device in accordance with a preferred embodiment of the present invention, the control unit is further configured to define, as the audio information thereof, the audio data associated with the presence information for expressing the current state of the other user.

In the terminal device in accordance with a preferred embodiment of the present invention, the control unit is further configured to define, as background music (BGM) of a chatting screen, the audio data associated with the presence information for expressing the current state of the other user.

In the terminal device in accordance with a preferred embodiment of the present invention, the control unit is further configured to generate a recommendation message which contains information of recommending the audio data associated with the presence information for expressing the current state of the other user, and to send the generated message to other terminal device.

In the terminal device in accordance with a preferred embodiment of the present invention, the control unit is further configured to generate a gift message which contains the audio data associated with the presence information for expressing the current state of the other user or a coupon for purchasing the audio data, and to send the generated gift message to other terminal device.

In the terminal device in accordance with a preferred embodiment of the present invention, the control unit is further configured to, when displaying the user list, compose icons to indicate the presence information and the audio information of the respective other users in the user list, and to control the output unit to display the composed respective icons corresponding to the respective other users.

In the terminal device in accordance with a preferred embodiment of the present invention, the audio data includes music to express the location when the presence information indicates a location, includes music to express the mood when the presence information indicates a mood, and includes tempo information which is proportionate to the state of being busy when the presence information indicates a state of being busy.

To achieve the above-discussed purpose, a terminal device in accordance with a preferred embodiment of the present invention provides presence information by communicating with a service device. The terminal includes a communication unit configured to send and receive messages in association with presence information to and from the service device; an output unit configured to output at least one of auditory information and visual information; and a control unit configured to, in response to a detection of predetermined input information, display a user list, to receive from the service device presence information and audio information associated with the presence information of a user selected from the displayed user list, and, when the received presence information and audio information are displayed through the output unit, to control the output unit to implement audio data contained in the audio information. In the terminal device, the user list contains specific information about at least one of other users, and the specific information includes profile information to identify the other user, and audio information in which the audio data associated with the presence information for expressing a current state of the other user is defined.

To achieve the above-discussed purpose, a service device in accordance with a preferred embodiment of the present invention includes a communication module configured to receive, from a first terminal device, a setting request message requesting presence information and audio data associated with the presence information to be defined, and to receive, from a second terminal device, an information request message requesting the presence information of the first terminal device; and a control module configured to store, in response to the setting request message, the presence information of the first terminal device and the audio data associated with the presence information of the first terminal device, and to transmit, in response to the information request message, the stored presence information of the first terminal device and audio information in which audio data is defined in association with the presence information, to the second terminal device.

In the service device in accordance with a preferred embodiment of the present invention, the control module is further configured to, when receiving the setting request message from the first terminal device, define presence information of the first terminal device, to search for audio data to express the defined presence information, and to store after mapping the searched audio data to the defined presence information.

To achieve the above-discussed purpose, a system for proving presence information in accordance with a preferred embodiment of the present invention includes a service device configured, when receiving a presence setting request from at least one terminal device, to store presence information of the terminal device and audio data associated with the presence information, and when receiving a presence information request from the terminal device, to transmit the requested presence information and audio information in which audio data associated with the requested presence information is defined; and the terminal device configured, when detecting predetermined input information from a screen of an instant messaging program, to display a user list which contains information about at least one of other users. In the system, the information about the other user includes profile information for identifying the other user, presence information for indicating a current state of the other user, and audio information in which audio data associated with the requested presence information is defined.

To achieve the above-discussed purpose, a method for proving presence information in a terminal device in accordance with a preferred embodiment of the present invention includes steps of: detecting predetermined input information from a screen of an instant messaging program; when the predetermined input information is detected, displaying a user list containing specific information about at least one of other users; and when at least one other user is selected from the displayed user list, outputting presence information of the selected other user and audio data defined in association with the presence information.

In the method in accordance with a preferred embodiment of the present invention, the specific information includes profile information for identifying the other user, presence information for indicating a current state of the other user, and audio information in which audio data associated with the requested presence information is defined.

The method in accordance with a preferred embodiment of the present invention further includes step of: receiving, from a service device, presence information of the selected other user and audio data defined in association with the presence information.

The method in accordance with a preferred embodiment of the present invention further includes steps of: defining input information for providing the presence information of the terminal device; defining audio data associated with the defined presence information; and sending the defined presence information to a service device.

Yet this invention may provide the computer-readable recording media to implement the method for providing presence information using audio data as described above.

Advantageous Effects

The present invention is to provide the presence information of users using audio intuitively and the users can gain a new user experience (UX, User eXperience), wherein the users can more intuitively perceive the presence information through audio instead of text. Accordingly, this invention will provide the opportunity to ensure the increasing use of application service exploiting the presence information.

Also, the present invention will provide the users with a way of easy access to the presence information of other users by displaying the user list on the current screen or on other separate screen following a detection of the predetermined swipe input information via the terminal device, without having to search for other user's contact information separately while in a chat.

MODE FOR CARRYING OUT THE INVENTION

Figure 1:
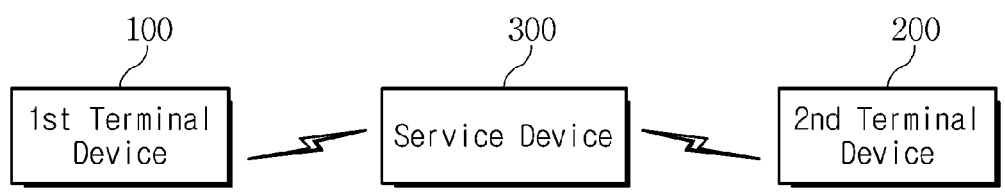
FIG. 1 is a block diagram illustrating a system for providing presence information using audio files in accordance with embodiments of the present invention.

Hereinafter, a preferred embodiment of the present invention will be described in detail with reference to the accompanying drawings. However, to avoid obscuring the subject matter of the present invention, well known functions or configurations will be omitted from the following descriptions and drawings. Further, the same elements will be designated by the same reference numerals although they are shown in different drawings.

FIG. 1 is a block diagram illustrating a system for providing presence information using audio files in accordance with an embodiment of the present invention.

Referring to FIG. 1, the system of the present invention includes a first terminal device 100, a second terminal device 200 and a service device 300.

The first terminal device 100 and the second terminal device 200 can be connected to the service device 300 via a network, and the service device 300 may provide a presence service for the connected first 100 and second terminal devices 100 and 200. The presence service refers to a service that provides the current state, namely, presence information, of other users within a user group registered as so-called "buddy". The "presence information" here may include the indication basically about the current state of connection of other user to a network, location of other user, availability for communication and the mood of other user and so on. In accordance with an embodiment of the present invention, the presence information of the first terminal device 100 or the second terminal device 200 may refer to information not only about the first terminal device 100 or the second terminal device 200 itself, but also about the user of the first terminal device 100 or the user of the second terminal device 200.

In embodiments of the present invention, the first terminal device 100 will be described as a device for providing the presence information and the second terminal device 200 will be described as a device for requesting the presence information of the first terminal device 100 selected in the user list displayed as a result of detecting the predetermined swipe input information by communicating with the service device 300. The service device 300 may provide the presence information of the first terminal device 100 to the second terminal device 200. Then, in accordance with embodiments of the present invention, the presence information of the first terminal device 100 will be delivered to the second terminal device 200 in the form of audio files instead of text files and the second terminal device 200 may produce (reproduce) the presence information composed of audio files. Thus, the user of the second terminal device 200 may gain a new user experience (UX) wherein user may perceive the presence information more intuitively through audio instead of text. A typical type of audio files would be music files. However, besides the music files, the user's own voice files or music files, video files, and animation files may also be employed.

Meanwhile, it should be noted that the first terminal device 100 or the second terminal device 200 has been separately designated only for convenience of description and depending upon the conditions of providing the presence information, the role of each terminal device may be reversed.

Figure 2:
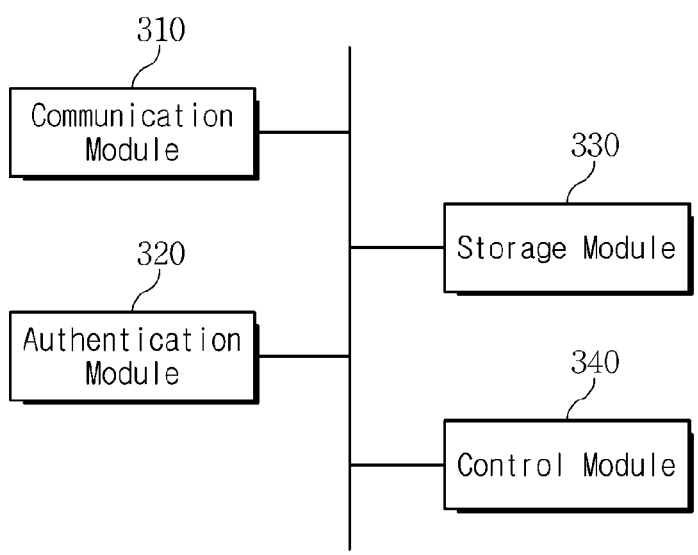
FIG. 2 is a block diagram illustrating a service device in accordance with embodiments of the present invention.

FIG. 2 is a block diagram illustrating a service device 300 in accordance with an embodiment of the present invention.

Referring to FIG. 2, the service device may include a communication module 310, an authentication module 320, a storage module 330 and a control module 340.

The communication module 310 is configured to send and receive data to and from the first terminal device 100 or the second terminal device 200 via the network 300. This data may include an information request message or a setting request message. The communication module 310 may further include a function to process data according to the type and protocol of the network.

The authentication module 320 is configured to identify if the user has been registered or not, and to register new user according to procedure. The authentication module 320 may perform the function of user authentication utilizing the user registration information entered by the user whenever the first and the second terminal device 100 and 200 are connected to the service device 300. The user authentication information may include, for example, a user ID (Identification) and a corresponding password.

The storage module 330 is configured to store information about a plural of terminal devices and the presence information mapped to each terminal device. Especially, the storage module 330 can store the audio data defined depending on the respective presence information. The form of storing data will be either by file system or by database system.

The control module 340 is configured to perform the corresponding operations at the request of the first terminal device 100 or the second terminal device 200 that is connected through the communication module 310. That is, when receiving the setting request message from the first terminal device 100 through the communication module 310, the control module 340 may define the presence information of the first terminal device 100 according to the received setting request message, and map audio data according to the defined presence information. Additionally, when receiving the information request message from the second terminal device 200 through the communication module 310, the control module 340 may send to the second terminal device the audio information, which includes the audio data created in connection with the presence information of the first terminal device 100, together with the presence information of the first terminal device 100, through the communication module 310, according to the received information request message.

Figure 3:
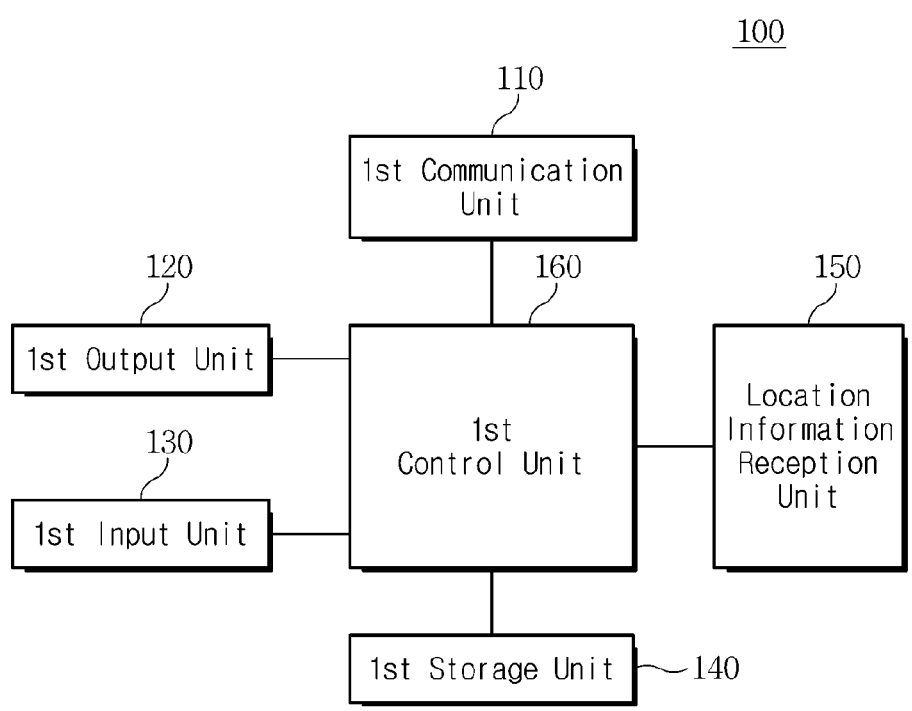
FIG. 3 is a block diagram illustrating a first terminal device for providing presence information in accordance with embodiments of the present invention.

FIG. 3 is a block diagram illustrating the first terminal device for providing presence information in accordance with embodiments of the present invention.

Referring to FIG. 3, the first terminal device 100 in accordance with embodiments of the present invention may include a first communication unit 110, a first output unit 120, a first input unit 130, a first storage unit 140, a location information reception unit 150 and a first control unit 160.

The first communication unit 110 is configured to define the presence information of the first terminal device 100 by communicating with the service device 300 via a network. The first communication unit 110 may send the presence information to be defined, to the service device 300 by the control of the first control unit 160. Additionally, the first communication unit 110 may transmit the audio information including the audio data defined in connection with the presence information. Here, the audio information may include the audio data file itself or the identity information about the audio data file, and the information about the audio data file (e.g., name of music, songwriter/composer, photo of album, lyrics, etc.).

The first output unit 120 is configured to output the information resulting from implementation of the first terminal device 100 so that users may perceive the information by using their senses such as hearing, sight, and touch. The first output unit 120 may include a display device to show visual information, an audio device to create auditory information, and a haptic device to create tactile information. The display device may employ a touch screen, and in this case the display device may perform all or parts of the functions of the first input unit 130. Speaker can be a representative example of the audio device, and a vibrator can be an example of the haptic device.

The first input unit 130 is a means for receiving at least one of user command, user selection, and user data, and may include a number of input keys and function keys for setting a variety of functions following receipt of the number and letter information. The first input unit 130 is further configured to detect the user's key input and send the detected key input signals to the first control unit 160. The first input unit 130 may include the input devices such as keyboard, keypad, mouse, joystick, and so on.

The first storage unit 140 is configured to store data and includes a main memory unit and a secondary memory unit. Thus, the first storage unit 140 can store an operating system (OS), applications, and the like. Especially, the first storage unit 140 stores a particular application for providing the presence information (in short words, 'presence application') in accordance with embodiments of the present invention. Here, the presence application may include, but not limited to, an address book, an instant messenger, and so on. Also, the first storage unit 140 can store various sorts of data generated from the use of the first terminal device 100. The various sorts of data stored in the first storage unit 140 can be deleted, changed or supplemented by user's manipulation.

The location information reception unit 150 is a means for receiving the current location information of the first terminal device 100. Thus, the location information reception unit 150 may receive GPS signals from GPS satellite and deliver the received GPS signals to the first control unit 160.

The first control unit 160 will actually be a processing unit for running OS. For example, the first control unit 160 can be a CPU (Central Processing Unit). The first control unit 160 transfers OS from the secondary memory unit to the main memory unit of the first storage unit 140 when power switch of the first terminal device 100 is turned on, and performs a booting process for running OS.

The first control unit 160, when receiving the user request from the first input unit 130, may generate a setting request message for defining the presence information and transmit the generated setting request message, via the first communication unit 110, to the service device 300. Then, according to the setting request message, the presence information of the first terminal device 100 can be defined. Also, the first control unit 160 may transmit the setting request message to the service device 300 when necessary or on a periodic basis, according to the information about the user's current location and state. In this case, the first control unit 160, whereby the presence function is defined and utilized by user's entering, can automatically generate and transmit the setting request message according to the change of information about the user's current location and state.

In particular, according to embodiments of the present invention, the setting request message may include the presence information of the first terminal device 100, and the information for defining specific audio data (hereinafter called 'audio information') corresponding to the presence information. The audio information can be either a corresponding audio data in itself or an audio data identifier.

For example, in case that the presence information indicates the location of the first terminal device 100 or of the user of the first terminal device 100, the location-related music to express the location can be selected. For example, if the user of the first terminal device 100 is located in Spain, a typical Spain-related music can be selected as audio data. Likewise, if the user is located in Busan, a typical Busan-related music can be selected as audio data. The music such as "Come Back to Busan Port", as an example, may be selected as a typical Busan-related music.

Also, for example, if the presence information indicates the mood of the user of the first terminal device 100, the music to express the user's mood can be selected. The following Table 1 illustrates a method for setting audio data corresponding to the presence information.

TABLE 1

| Presence Information | Audio Data |
| --- | --- |
| Happy mood | Music 1 (music of a happy atmosphere) |
| ... | ... |
| Gloomy mood | Music 2 (music of a gloomy atmosphere) |

As shown in Table 1, if the presence information of the user of the first terminal device 100 is defined as "happy mood", music of a happy atmosphere can be selected, and if the presence information of the user of the first terminal device 100 is defined as "gloomy mood", music of a gloomy atmosphere can be selected.

For another example, the presence information in accordance with one embodiment of the present invention can normalize, input, and show the present state of being busy of the user of the first terminal device 100. When the presence information normalizes the present state of being busy of the user of the first terminal device 100, the tempo of music can be modulated in order to properly show the present state of being busy.

The following Table 2 illustrates the audio data for expressing the state of being busy in accordance with embodiments of the present invention.

TABLE 2

| Presence Information (state of being busy) | Tempo of Music |
|---|---|
| Very busy | 7 |
| Busy | 6 |
| A little busy | 5 |
| Usual | 4 |
| A little leisurely | 3 |
| Leisurely | 2 |
| Very leisurely | 1 |

The presence information, as shown in Table 2, may be set by normalizing the state of being busy, wherein the state attributes may be classified as "Very busy", "Busy", "A little busy", "Usual", "A little leisurely", "Leisurely", and "Very leisurely". In this case, if a specific music is selected as audio data corresponding to the present information, the tempo of music may be modulated as tempo 1 or tempo 7 according to the presence information as shown in Table 2, and can be included in the setting request message. Here, the tempo 1 indicates the slowest tempo and the tempo 7 indicates the fastest tempo.

In the generation of the setting request message as describe above, if a user inputs all the presence information and the corresponding audio data through the first input unit 130, the first control unit 160 can generate a setting request message according to the input information.

Additionally, in the generation of the setting request message as describe above, if a user inputs only the presence information through the first input unit 130, the control unit 160 may detect the user input and can include the corresponding audio data after searching for audio data corresponding to the presence information from the audio data stored in the first storage unit 140, according to the rules as described above in the first or third embodiment.

Moreover, the setting request message can be generated automatically. For example, when there is a change of location, the first control unit 160 may recognize the location by receiving the location change information (GPS signals) from the location information reception unit 150, and may change the presence information according to the changed location, and can include the corresponding audio data after searching for the audio data stored in the first storage unit 140. Meanwhile, the location information may be equivalent, but not limited, to the location information from the location information reception unit 150, and be obtained utilizing plural base stations. In this case, the location information is obtained through the first communication unit 110.

The first control unit 160, when searching for the audio data corresponding to presence information, may obtain the necessary information for searching from the audio data header. For example, the header of music files may include information such as title, composer, album, year, description, genre, bit rate, sampling rate, channel, producer, comments on music and the like. Accordingly, the first control unit 160 can look for the relevant music using the information above.

As described above, if the audio data corresponding to the present information is included in the presence information, the service device 300 is, when other terminal devices request the presence information of the first terminal device 100, configured to provide the corresponding audio data together with the presence information so that other terminal devices may express the presence information of the first terminal device 100 using the audio data.

Meanwhile, the first control unit 160 may send only location or state category as presence information to the service device 300 without carrying out the direct setting of the presence information. Accordingly, the first control unit 160 may receive the presence information and the audio data to express the presence information, which are set by category, from the service device 300, on a periodic basis or whenever there is a change.

Figure 4:
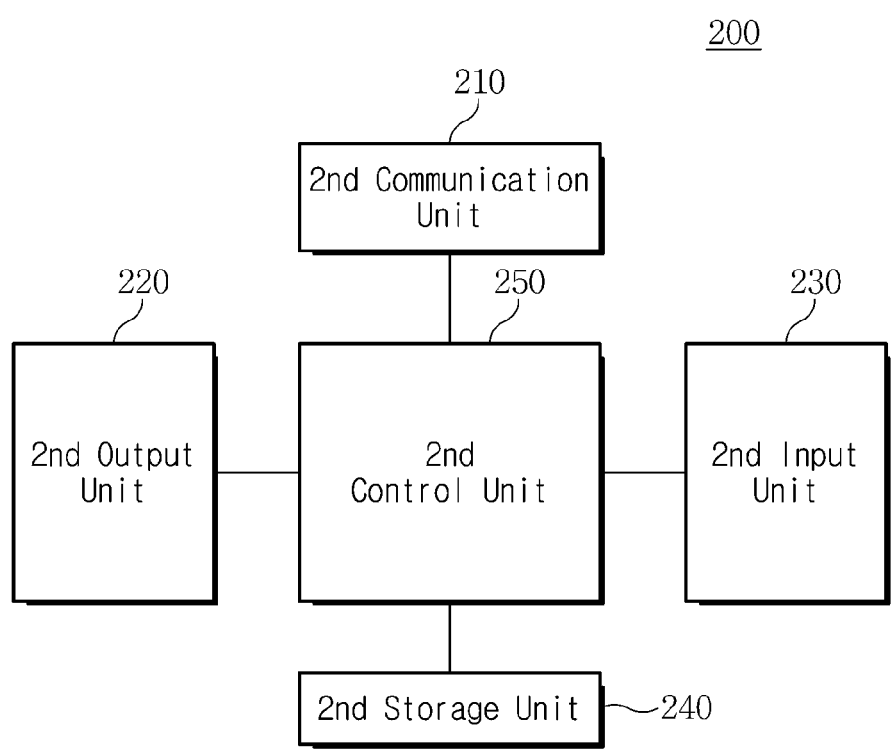
FIG. 4 is a block diagram illustrating a second terminal device for providing presence information in accordance with embodiments of the present invention.

FIG. 4 is a block diagram illustrating a second terminal device for providing presence information in accordance with embodiments of the present invention.

Referring to FIG. 4, the second terminal device 200 in accordance with embodiments of the present invention may include a second communication unit 210, a second output unit 220, a second input unit 230, a second storage unit 240, and a second control unit 250.

The second communication unit 210 is configured to communicate with the service device 300 via a network. The second communication unit 210 is further configured to request the presence information of the first terminal device 100 and perform operations to obtain the presence information by the control of the second control unit 250. Thus the second communication unit 210 may receive the audio information for defining the audio data associated with the presence information together with the presence information of the first terminal device 100.

The second output unit 220 is basically a means of outputting the information resulting from the use of the second terminal device 200 so that users may perceive the information using their senses such as hearing, sight, and touch. The second output unit 220 may include a display device to show visual information, an audio device to create auditory information, and a haptic device to create tactile information. The display device may employ a touch screen, and in this case the display device may perform all or parts of the functions of the second input unit 230. Speaker can be a representative example of the audio device. Accordingly, the second output unit 220 in accordance with an embodiment of the present invention may output the presence information of the specific terminal device (e.g. the first terminal device 100) through the audio device. And a vibrator can be an example of the haptic device. Furthermore, the second output unit 220 may display a user list on the screen in response to a detection of swipe input information. Here, the user list will include the information about one or more of other users, that is, profile information to identify other user, and presence information to indicate the current status of other user and the audio information whereby the audio data can be generated in association with the presence information. Here, the audio information may include an audio data file itself or identity information about the audio file, and information about the audio data (e.g., name of music, songwriter/composer, photos of album, lyrics, etc.) and so on, and the audio information, with reference to name of music, main photo of album, background music (BGM), etc., can be displayed with the icons on the user list. Likewise, with reference to the presence information, the location or state category only can be displayed with the icons.

And the second output unit 220 is configured to display a presence information screen in response to a random selection of a user on the user list screen. This presence information may be displayed as a pop-up window or on a certain spot of the user list screen, or on other separate screen. Then, on the presence information screen, the detailed presence information and the audio information to express the presence information can be displayed, and the audio data included in the audio information will be output through speaker, automatically or by user selection.

The second input unit 230 is a means for receiving at least one of user command, user selection, and user data, and may include a number of input keys and function keys for setting a variety of functions following receipt of the number and letter information. And the second input unit 230 is configured to detect the user's key input and send the detected input signals to the second control unit 250. The second input unit 230 may include the input devices like keyboard, keypad, mouse, joystick, and so on. Especially, the second input unit 230 in accordance with embodiments of the present invention is configured to detect the user's predetermined swipe input information and to deliver the input signals of the detected swipe input information to the second control unit 250.

The second storage unit 240 is configured to store data and includes a main memory unit and a secondary memory unit. Thus, the second storage unit 240 can store an OS (Operation System), applications, and the like. Especially, the second storage unit 240 stores an application for providing the presence information in accordance with embodiments of the present invention. Also, the second storage unit 240 can store the various sorts of data generated from the use of the second terminal device 200. Especially, the second storage unit 240 in accordance with embodiments of the present invention can store information about the predetermined swipe function, contact information of other user, presence information, and audio data to express the presence information. The various data stored in the second storage unit 240 can be deleted, changed or supplemented by the user's manipulation.

The second control unit 250 will actually be a processing unit for running OS. For example, the second control unit 250 can be a CPU (Central Processing Unit). The second control unit 250 may perform the messenger service function for communication with other user by running a messenger program (instant program) and can define user's input information in advance using a swipe or shake function. For example, the second control unit 250 can define, as the input information, any swipe input in a certain direction or any shake input entered through a shake menu or on a chatting screen.

Also, the second control unit 250, when the predetermined input information is delivered from the second input unit 230, may detect the delivered predetermined input information, and may display the user list on a certain spot of the current screen or on other separate screen. For this, the second control unit 250 can define that a specific application will be implemented in response to particular input information. For example, according to embodiments of the present invention, the second control unit 250 may define that a user list will be displayed on a certain spot of the current screen or on other screen appearing after a leftward move from the current screen when a leftward swiping input is received on the current screen. For another example, it may be defined that a user list will be displayed in response to any shaking input received while a chatting screen is shown or after a shake menu is selected on the chatting screen or on a specific menu window appearing by a certain swiping input.

The input information may be defined when a relevant application is developed. In this case, when the predetermined input information is detected, a particular service function corresponding to the detected input information will be implemented by immediately. Here, one or more of other user's contact information, photo, email address, etc. stored in the address book may be displayed on the user list.

According to one embodiment of the present invention, when the predetermined input information is detected on a certain screen of an instant messaging program, the second control unit 250 receives the presence information and the audio information created according to information about the present location and state of other user from the service device 300 via the second communication unit 210, and displays the received presence information and audio data on a certain spot of the current screen or on other screen.

Next, according to another embodiment of the present invention, when the predetermined input information is detected on a certain screen of an instant messaging program, the second control unit 250 runs a specific application for providing the presence information, and displays brief presence information about items like location, state, and so on. For this purpose, the second control unit 250 may periodically receive the presence information from the service device 300, store the received information, and display the stored presence information on a certain spot of the user list when the predetermined input information is received. And then, if a user would select the presence information of a specific one of other users, the control unit can output the audio information together with the presence information. If audio information is not included in the presence information, the control unit may generate an information request message for acquiring the audio information.

In more detail, after running the presence application, the second control unit 250 may generate an information request message requesting the presence information of the specific terminal device and send the information request message to the service device 300 via a second communication unit 210. In the information request message, the subject terminal device can be specified. For instance, if the second terminal device 200 requests the presence information of the first terminal device 100, the service device 300 may provide the presence information of the first terminal device 100 according to the request from the second terminal device 200 and in case audio information corresponding to the presence information of the first terminal device 100 is determined, the service device 300 will provide the audio information including the with audio data for expressing using audio, too.

The second control unit 250 receives the presence information and the associated audio information via the second communication unit 210 and outputs through the second output unit 220.

For example, when the presence information indicates the location of the user of the first terminal device 100, the music that may properly express the location can be played. If, for instance, the user of the first terminal device is located in Spain, a typical Spain-related music may be played as the audio data corresponding to the present information. Also, the user is located in Busan, a typical Busan-related music can be selected as audio data. Such music like "Come Back to Busan Port" can be chosen as a typical Busan-related music.

For another example, when the presence information indicates the user's mood, the music that properly expresses the user's mood can be played. Referring to Table 1, if the presence information of the user of the first terminal device 100 is determined as "happy mood" the music of a happy atmosphere can be played and when the presence information of the user of the first terminal device is determined as "gloomy", the music of a gloomy atmosphere will be played.

Another example is that, when the presence information of the first terminal device 100 indicates the state of being busy of the user of the first terminal device 100, the relevant audio data having the tempo that may properly express the state of being busy, can be output. Referring to Table 2, when the presence information is set as one of "Very busy", "Busy", "A little busy", "Usual", "A little leisurely", "Leisurely", and "Very leisurely", the tempo to be output may be modulated such as tempo 1 or tempo 7.

Then, in the system for providing presence information as described above in accordance with embodiments of the present invention, the system for providing the presence information using audio data through the user list displayed following swipe input will be described with reference to the accompanying drawings.

First, according to one embodiment of the present invention, a system for proving the presence information using audio data according to the swipe input will be described below in detail with reference to the drawings. In one embodiment of the present invention, it will be described that the second terminal device 200 is requesting the presence information of the first terminal device 100 for convenience of description, and it should be noted that the role of each terminal device can be reversed. For example, the first terminal device 100 and the second terminal device 200 can carry out the function of providing the presence information following a detection of the predetermined swipe input information on a chatting screen or on other screen of a messenger program, when chatting with one or more of other users.

Figure 5:
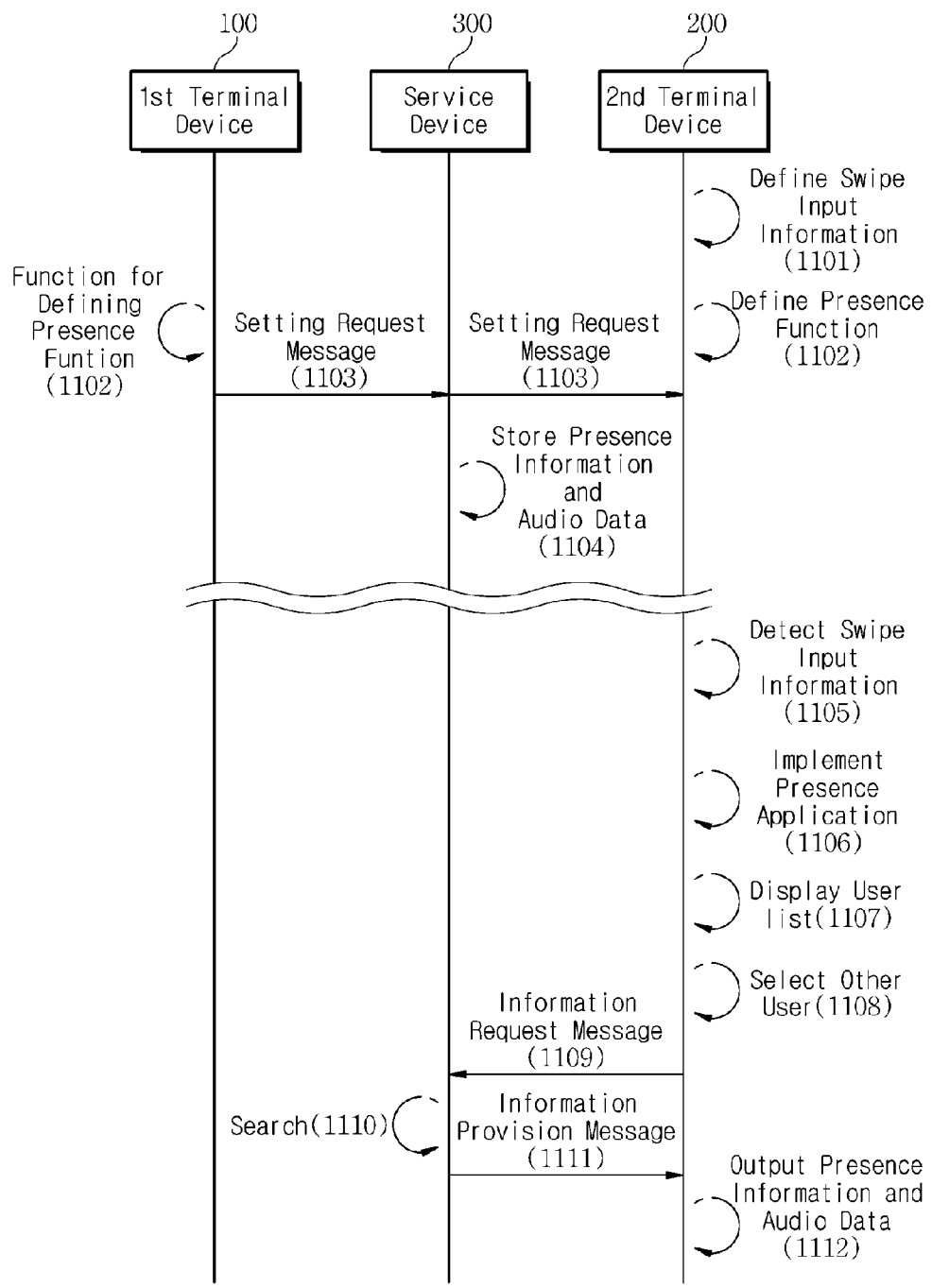
FIG. 5 is a flow diagram illustrating a method for providing presence information using audio data in response to a detection of swipe input information in a presence information providing system in accordance with one embodiment of the present invention.

FIG. 5 is a flow diagram illustrating a method for providing presence information using audio data in response to a detection of the predetermined swipe input information in a presence information providing system in accordance with one embodiment of the present invention.

Referring to FIG. 5, in step 1101, the second terminal device 200 may determine, in advance, the user input information, e.g. swipe input information in order to run a specific application or function. This step 1101 may be performed at the time of program development, and it should be noted that unless the user can set the information, this step can be skipped.

Meanwhile, in step 1102, each of the first terminal device 100 and the second terminal device 200 defines that a presence function will be implemented in response to the user request if the user would select the presence function displayed on a messenger service screen or on a specific menu screen. Here, the first terminal device 100 and the second terminal device 200 may directly set the presence information, search for audio data to express the presence information, and map the audio data to the presence information.

Accordingly, in step 1103, the first terminal device 100 and the second terminal device 200, respectively, may send a setting request message, which includes each device's own presence information along with the audio data to express the presence information, to the service device 300. And then, the service device 300 receiving the setting request message, in step 1104, may execute mapping and storing the presence information and the audio information which includes audio data to express the presence information of the first terminal device 100 and the second terminal device 200 respectively.

Specifically, the first terminal device 100 may implement a presence application according to the user request. And then, the first terminal device 100 may generate a setting request message including the presence information and the corresponding audio data, either manually or automatically or semi-automatically. For example, in case of manual generation, the first terminal device 100 would be able to generate the setting request message in response to the user input once the user would finalize entering both the presence information and the corresponding audio data. Also, in case of semi-automatic generation, the user may enter just the presence information, and then the first terminal device 100 will detect the entered information, retrieve audio data corresponding to the entered presence information from audio data stored in the first storage unit 140, and add the retrieved audio data to the setting request message. And, in case of automatic generation, the first terminal device 100, when location information changes, may acquire the location information utilizing GSP signals or signals from base stations for detecting the location, change the presence information according to the detected location, retrieve relevant audio data from audio data stored in the first storage unit 140, and add the retrieved audio data to the setting request message.

Thereafter, the second terminal device 200, by running a messenger program, may implement the messenger service for chatting with the user of the first terminal device 100 or of one or more other terminal devices (not illustrated), and an example of providing the presence information in this messenger service may be illustrated. However, if the messenger service is not available and instead a website's main page or other program service is being implemented, according to one embodiment of the present invention, the presence information using audio data following a detection of swipe input information will be provided.

For example, while implementing messenger service, the second terminal device 200, in step 1105, detects the predetermined swipe input information entered by the user, implements a presence application in step 1106, and immediately displays, on a certain spot of the current screen or on other separate screen, the user list which will include the information about other users such as contact information, photos, and email addresses, and so on. Here, the presence application may be an address book (also referred to as a phonebook), an instant messenger, and the like. And the presence application can display other users in the user group called 'buddy'. Displaying of the user group would be altered depending on the design of user interface (UI) and, illustratively, it would be desirable to use the icons for displaying and identifying each user.

Thereafter, in step 1108, when one or more users are selected in the user list displayed, the second terminal device 200 may generate an information request message requesting the presence information of the terminal device of the selected other user, e.g. the first terminal device 100. Here, the information request message may include the identity information of the first terminal device 100, presence request information, and so on. Also, the information request message may include the audio data information which expresses its own presence information.

In step 1109, the second terminal device 200 accesses the service device 300 and transmits the generated information request message to the service device 300.

Then in step 1110, the service device 300 receiving the information request message for the presence information may check if there is audio data corresponding to the presence information of the first terminal device 100. As supposed earlier, if the audio data to express the presence information of the first terminal device 100 is defined, the service device 300 may receive the information provision message in step 1111, generate an information provision message including the presence information of the first terminal device 100 and the audio information for setting audio data associated with the presence information, and transmit the generated information provision message to the second terminal device 200.

In step 1112, the second terminal device 200 may display, on a certain spot of the current screen or on other screen, the presence information and audio information received from the service device 300. For example, if the presence information of the first terminal device 100 is defined on the basis of user's mood, the second terminal device 200 may provide specific music according to the user's mood. Accordingly, the user of the second terminal device 200 may perceive the presence information of the first terminal device 100 intuitively.

If, in step 1112, the second terminal device 200 receives, from the service device 300, the audio data representing presence information thereof, the received audio data will be stored, and when the user would select the presence function menu displayed on a certain spot of a chatting screen or on other screen, the audio data thereof will be implemented while chatting. Also, the second terminal device 200, if the user list would be displayed in response to a detection of the input information, may display presence information thereof and the icons or menu for expressing the audio information on a certain spot (e.g., upper place or lower place) of the screen where the user list is being displayed.

Further, the second terminal device 200, if the predetermined input information for checking presence information thereof is detected, may display a menu screen whereby the presence function settings and presence information thereof could be checked. Accordingly, if the user selects presence information thereof displayed on the menu screen, the second terminal device 200 will execute the audio data stored after being mapped to the presence information.

Figure 6:
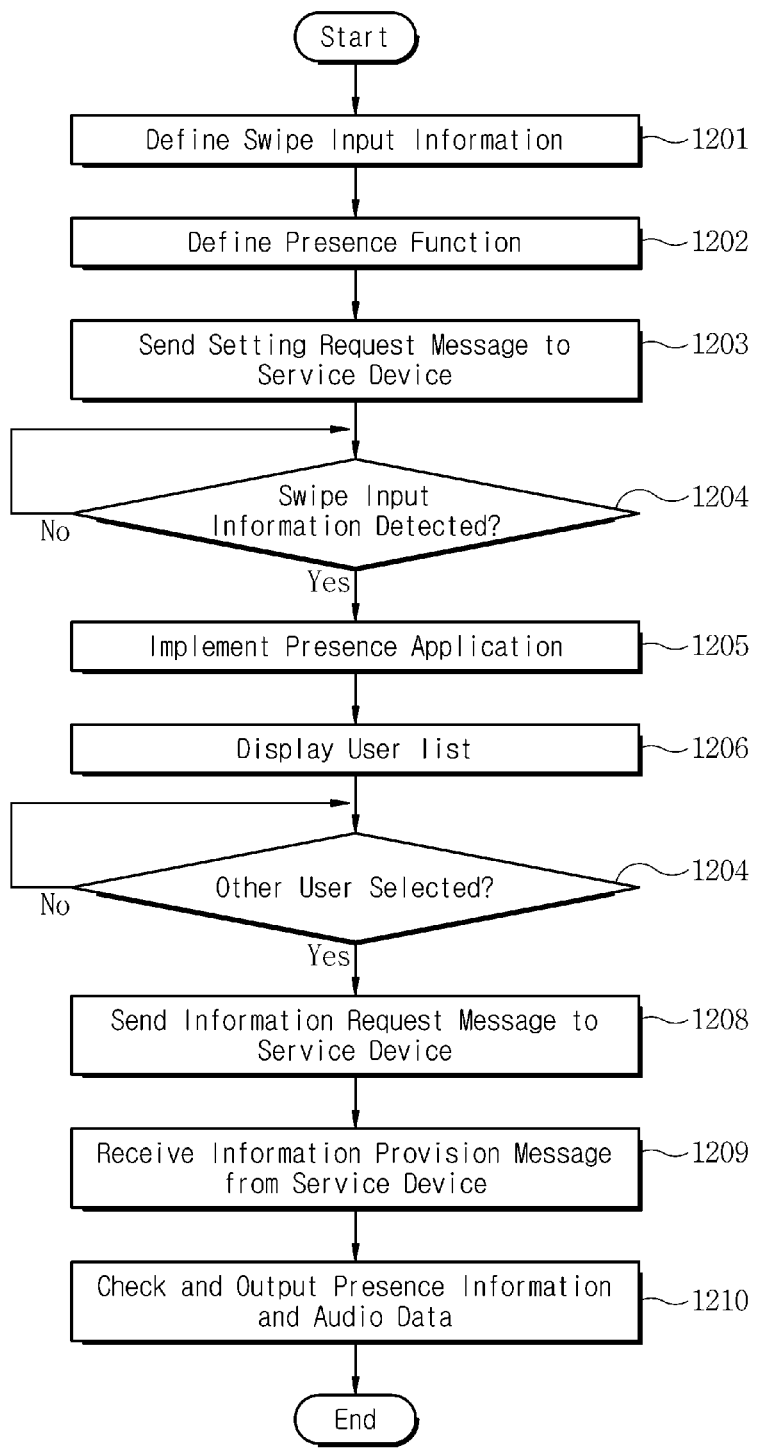
FIG. 6 is a flow diagram illustrating a method for providing presence information using audio data in response to a detection of swipe input information in a terminal device in accordance with one embodiment of the present invention.

FIG. 6 is a flow diagram illustrating a method for providing presence information using audio data in response to a detection of the predetermined swipe input information in a terminal device in accordance with one embodiment of the present invention. According to one embodiment of the present invention, the terminal device for providing presence information using audio data will be described with reference to the second terminal device 200 as an example.

Referring to FIG. 6, in step 1201, the second control unit 250 of the second terminal device 200 may define input information (i.e., swipe or shake). The second output unit 220 may display a menu screen for setting the input information on an application menu screen or on a system setting screen. If the user selects a swipe or shake menu in the input information setting item, the second control unit 250 receives a selection signal and defines the input information for providing presence information as a swipe or shake action.

In step 1202, the second control unit 250 receives and stores a presence application from the service device 300 and defines that the presence function will be implemented at the user request. For example, if a user clicks a presence menu on a menu screen or on a system setting screen, the second output unit 220 can display a pop-up window to check the user's choice of ON/OFF of the presence function. Accordingly, if user would choose ON, the second control unit 250 can control providing the presence function. At this time, if the presence information and audio data would be directly defined in the second terminal device, the second control unit 250 may implement a presence application, and will define and store the presence information and audio data.

Afterwards, in step 1203, the second control unit 250 sends a setting request message associated with presence setting to the service device 300. Here the setting request message may include identity information, presence information, and audio information for defining audio data, and if the presence information and the audio data would not be directly defined in the second terminal device 200, the setting request message may include the identity information and any other information for expressing the presence information which only includes items such as location and state.

Figure 7:
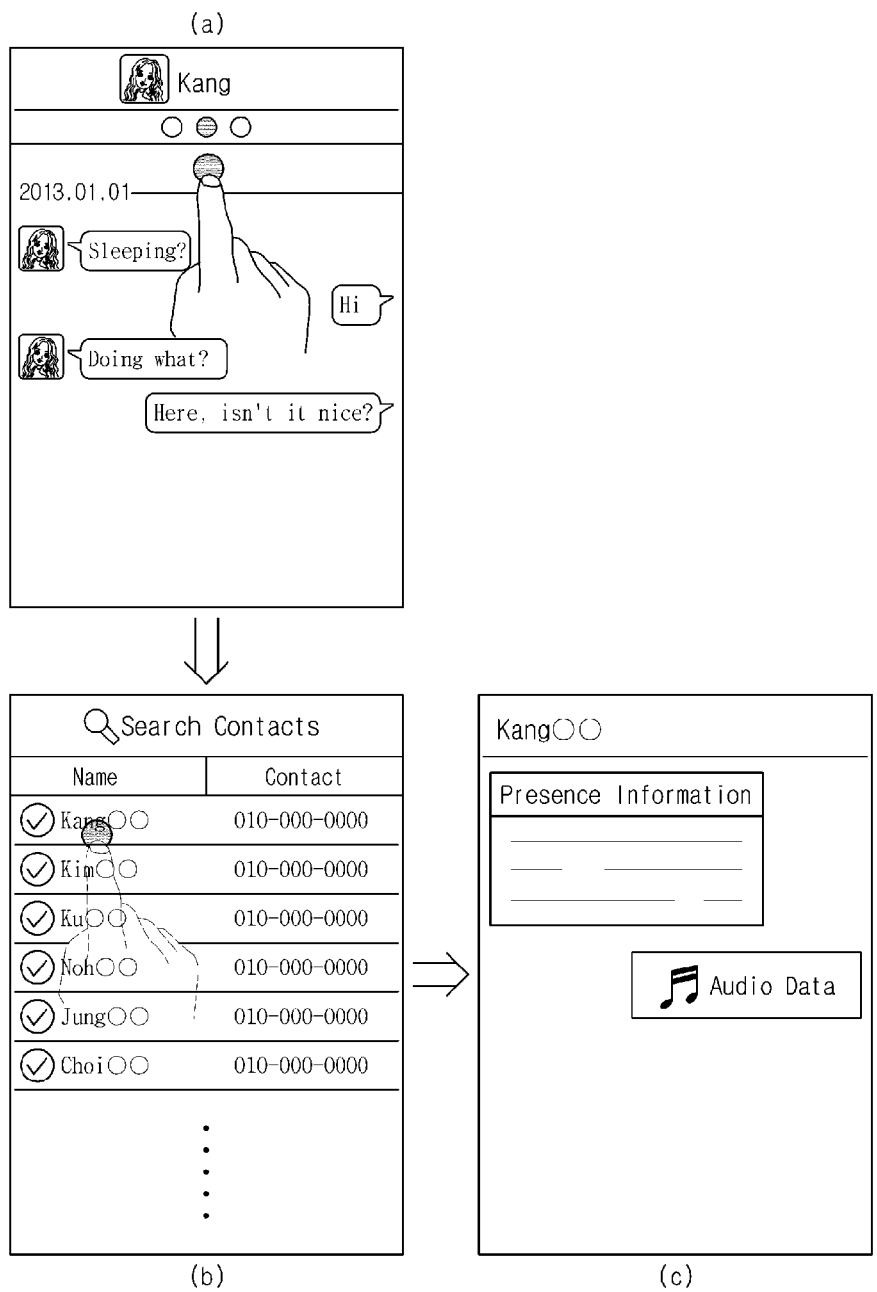
FIG. 7 shows exemplary screenshots of a contact list and a present information screen displayed in response to a detection of predetermined input information in a terminal device in accordance with one embodiment of the present invention.

After this, in step 1204, the second control unit 250 may check if there is a detection of the predetermined input information of the user, and if not, will continue to check if there is a detection or not. On the contrary, if there is a detection of the predetermined input information, in step 1205, the second control unit 250 may run a presence application and, in step 1206, may display the user list on a certain spot of the current screen or on other screen. For example, if a user swipes a specific menu on the chatting screen of messenger service as seen from screenshot (a) in FIG. 7, the second control unit 250 can display the user list as seen from screenshot (b) in FIG. 7. At this time, the second control unit 250, if the user would select the address book as an item of the user list when setting the presence function, may control displaying, on the user list, profile information of other users in the address book. Also, as seen from screenshot (b) in FIG. 7, the second control unit 250 may compose icons for expressing the presence information and the audio information on the user list, and can control the icons to be displayed together with the respective other user's profile information which the icons are mapped to.

Also, if messenger service is currently available, the second control unit 250 may allow other users who participate in chatting to be arranged on the user list and to have access to the address book or the group determined by the user. To this end, the second output unit 220 may display, on the user list screen, the menu for accessing to the address book or group.

Accordingly, in step 1207, the second control unit 250 checks if the user would select a desired one of other users arranged in the user list. And if the other user is selected, in step 1208, the second control unit 250 may generate an information request message including request for identity information and presence information, and will send the generated information request message to the service device 300. Then, the service device 300 may perform searching for the present information and the audio data of the selected other user, and can provide the searched presence information and audio information whereby audio data could be determined.

Then in step 1209, the second terminal device 200 receives an information provision message including presence information and audio data, and in step 1210 the second control unit 250 controls the received presence information and the audio data to be displayed on a certain spot of the current screen or on other screen. Accordingly, the second output unit 220, as seen from screenshot (c) in FIG. 7, may display the presence information and the audio information associated with the presence information on a screen and can immediately output audio data which expresses the presence information of the selected user.

Next, in the system for providing presence information in accordance with another embodiment of the present invention, a method for providing presence information using audio data according to the predetermined input information will be hereinafter described in detail. In another embodiment of the present invention, it will be described that the second terminal device 200 is providing the presence information of the first terminal device 100 for convenience of description, and it should be noted that the role of each terminal device can be reversed.

Figure 8:
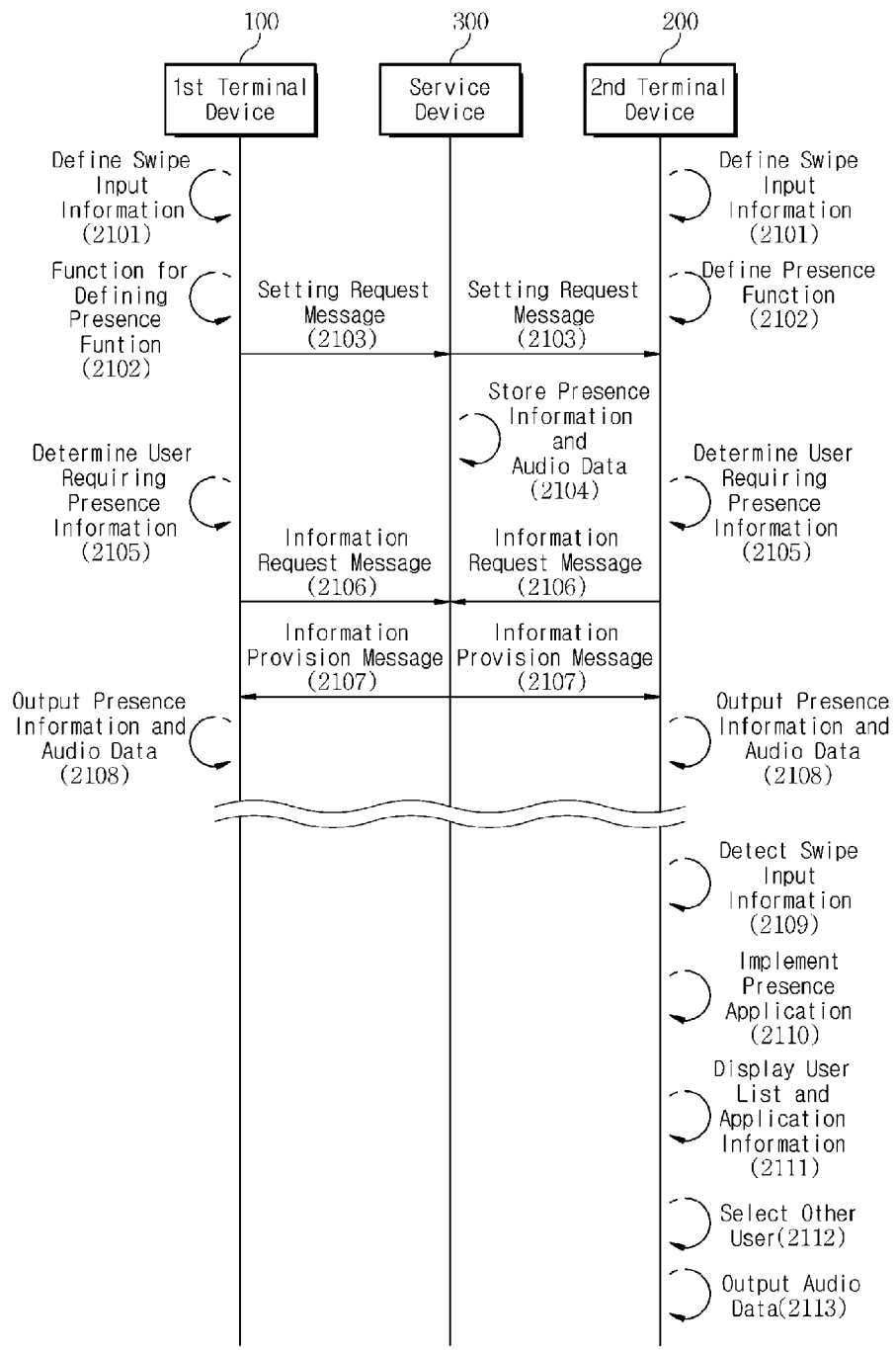
FIG. 8 is a flow diagram illustrating a method for providing presence information using audio data in response to a detection of predetermined input information in the system for providing presence information in accordance with another embodiment of the present invention.

FIG. 8 is a flow diagram illustrating a method for providing presence information using audio data in accordance with another embodiment of the present invention.

Referring to FIG. 8, firstly, in step 2101 the first terminal device 100 and the second terminal device 200, respectively, may define in advance the predetermined input information for running a specific application or function, that is, swipe input information. This step 2101 may be performed at the time of program development and it should be noted that unless user can set the information, this step can be skipped.

Meanwhile, in step 2102 the first terminal device 100 and the second terminal device 200 defines the presence function, and in step 2103 sends a setting request message requesting for setting of the presence information thereof and audio data for expressing the presence information, to the service device 300. Here, the presence information and audio information for setting audio data to express the presence information, as illustrated in one embodiment of the present invention, may be defined by the first terminal device 100 and the second terminal device 200 respectively, and the defined presence information and audio information may be included in the setting request message and be sent to the service device 300. On the other hand, the presence information and the audio data which expresses the audio information associated with the presence information may not be defined by the first terminal device 100 and the second terminal device 200, but the service device 300 may collect the information of each terminal device 100, 200 and may define and store the presence information and the audio data respectively. At this time, the service device 300 may receive, from the first terminal device 100 and the second terminal device 200, just items such as location, mood, and so on, as information for expressing the presence information.

Accordingly, in step 2104 the service device 300 which receives a setting request message defines the presence information of the first terminal device 100 and the second terminal device 200 respectively. Then, the service device 300 can map and store the audio data based on the presence information of each terminal device 100, 200. For example, in case the presence information received from the first terminal device 100 indicates location, the service device 300 checks the location of the user of the first terminal device 100, defines the presence information in connection with the checked location, searches for audio data to express the defined presence information, maps the searched audio data to the presence information, and stores.

Afterwards, in step 2105 the first terminal device 100 or the second terminal device 200 may generate an information request message including information about the users who want the presence information and its own presence information and send the generated information request message to the service device 300. For example, the first terminal device 100 or the second terminal device 200, while messenger service is currently available, may determine other users who are participating in chatting within a chatting group, as the users to whom the presence information is to be provided, and may include the information about the determined other users in the information request message. Besides, the users in the address book, other users and friends personally selected by a user, the users belonged to family, company, or other, can be determined as the users to whom the presence information is to be provided. For this, the first terminal device 100 and the second terminal device 200 may provide the menu whereby the users or the users groups, who want to keep receiving the presence information automatically through the presence function menu, can be determined.

If the service device 300 receives the information request message from the first terminal device 100 or from the second terminal device 200, in step 2106 the service device 300 starts searching for the stored presence information and the corresponding audio data. Afterwards, in step 2107, the service device 300 sends the information provision message including the searched presence information and audio data, to the first terminal device 100 or the second terminal device 200. Here, step 2106 and step 2107 will be implemented on a periodic basis or whenever there is a change of the presence information, and, accordingly, the service device 300 can automatically keep sending the information provision message to the first terminal device 100 or the second terminal device 200.

In step 2108, the first terminal device 100 or the second terminal device 200 receives, from the service device 300, the information provision message on a periodic basis or whenever there is a change of the presence information, stores and updates the presence information and audio data to express the presence information which is included in the information provision message.

In step 2109, the second terminal device 200 detects the predetermined input information entered by user, and, in step 2110, the second terminal device 200 runs a presence application, and, in step 2111, displays the user list on the current screen or on other screen. At this time, the second terminal device 200 may check if the presence information of the users in the user list to be displayed on the screen is stored or not, and may display the icons for expressing the presence information and audio information (e.g. name of music, main photo of the music album, background music, etc.) of the respective users stored following mapping of the icons to the user profile information in the user list. Here, the user list can show all users in the address book, user groups in the address book, chatting group users or the selected other users, and can include the user profile information (name, contact information, photo, e-mail address, etc.), presence information, and audio information of the respective users.

Accordingly, in step 2112, if a user would selects one random user out of the displayed user list, in step 2113, the second terminal device 200 reads the stored audio data for expressing the presence information, and with the read audio information being displayed on a screen, outputs background music from the audio data. Then, if none of the stored audio data exists, the second terminal device 200 may request the identity information and the audio data request information of the wanted user from the service device 300, receive the audio data of the wanted user from the service device 300, and output the received audio data.

Meanwhile, if a user, of whom presence information is not included in the displayed user list, is selected, the first terminal device 100 may request the presence information and the audio data to express the present information of the selected other user, and may output the received presence information and the audio data to express the presence information.

Figure 9:
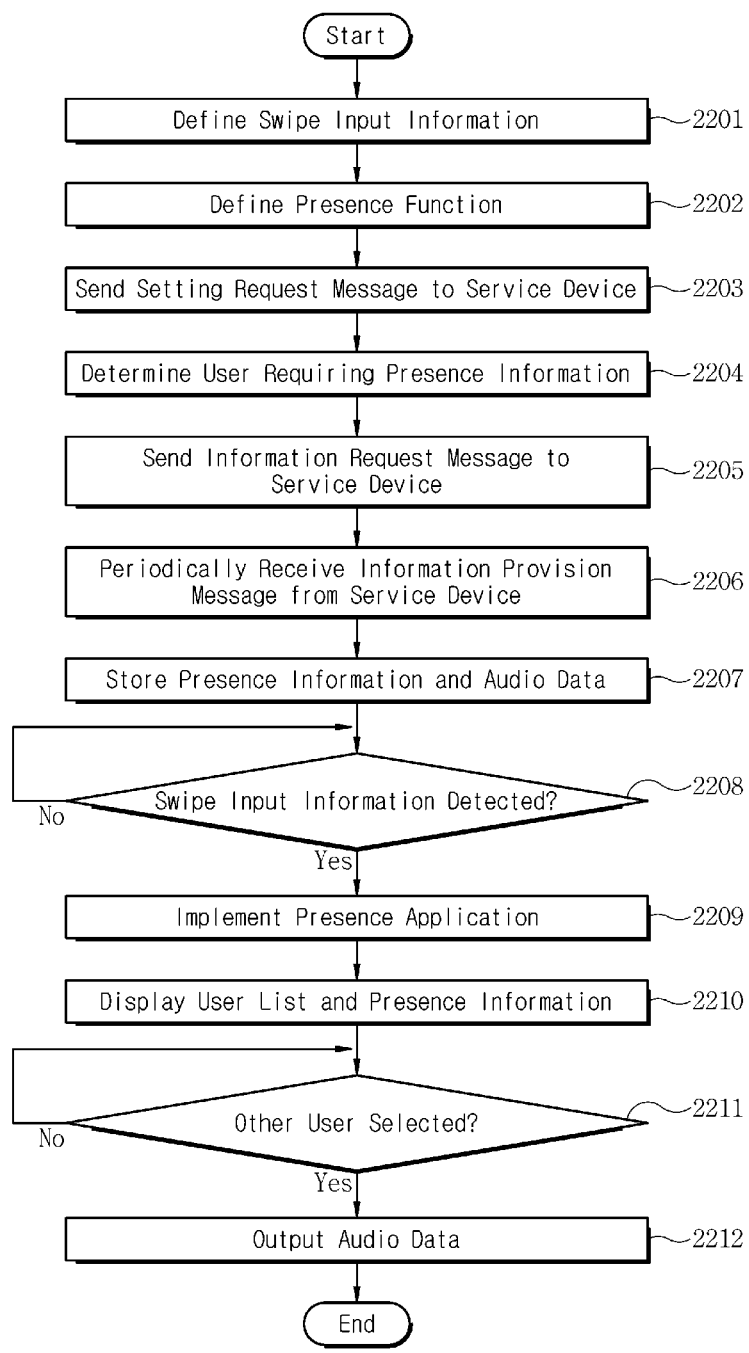
FIG. 9 is a flow diagram illustrating a method for providing presence information using audio data in response to a detection of predetermined input information in a terminal device in accordance with another embodiment of the present invention.

FIG. 9 is a flow diagram illustrating a method for providing presence information using audio data in response to a detection of the predetermined input information in a terminal device in accordance with another embodiment of the present invention. According to another embodiment of the present invention, the second terminal device 200 will be designated for description as an example of the terminal device for providing presence information using audio data, and the swipe input information will be designated for description as an example of the predetermined input information.

Referring to FIG. 9, in step 2201, the second control unit 250 of the second terminal device 200 may set the predetermined input information. The second output unit 220 can display the menu for determining the input information on an application menu screen or on a system setup screen. For example, if a user would select swipe out of the input information setup categories displayed on a screen, the second control unit 250 may receive the selected signals and determine swipe as information for providing the presence information.

In step 2202, the second control unit 250 receives and stores the presence application from the service device 300, and defines the presence function for implementation at the request of the user. For example, if a user would click on the presence menu on the menu screen or on the system setting screen, the second output unit 220 may display a pop-up window to check if the presence function is ON or OFF. Accordingly, if the user would determine the presence function as ON, the second control unit 250 can manage to provide the presence function. At this time, if the second terminal device 200 directly defines presence information and audio data, the second control unit 250 will run a presence application and will define and store the presence information and the audio data.

Then, in step 2203, the second control unit 250 sends a setting request message for presence determination. Here, the setting request message may include identity information, presence information and audio data, and unless the second terminal device 200 directly determines the presence information and the audio data, the setting request message may include identity information and presence information including only location and state items.

In step 2204, the second control unit 250 determines the users, to whom the presence information is to be provided from the service device 300 on a periodic basis or whenever there is a change of information. For example, on a presence function setup screen, the users requesting presence information can be determined by categorization of users by the address book, the determined group, or users currently in chat. Then, if the user determines the address book, the second control unit 250 may display the user list in the stored address book, and will allow the user to select the wanted user or all users and to determine the user as presence information request user.

Hereafter, in step 2205, the second control unit 250 sends an information request message including the identity information of the determined presence information request users, to the service device 300. Accordingly, in step 2205, the second control unit 250 may receive, from the service device 300, an information provision message including the presence information and the audio data about one and more of users, which has been requested on a periodic basis. Unless the second terminal device 200 directly determines the presence information and the audio data, the second control unit 250 may receive, from the service device 300, its own presence information and the audio data on a periodic basis or whenever there is a change.

Then, in step 2207, the second control unit 250 stores the received presence information and audio data through the information provision message into the second storage unit 240.

Figure 10:
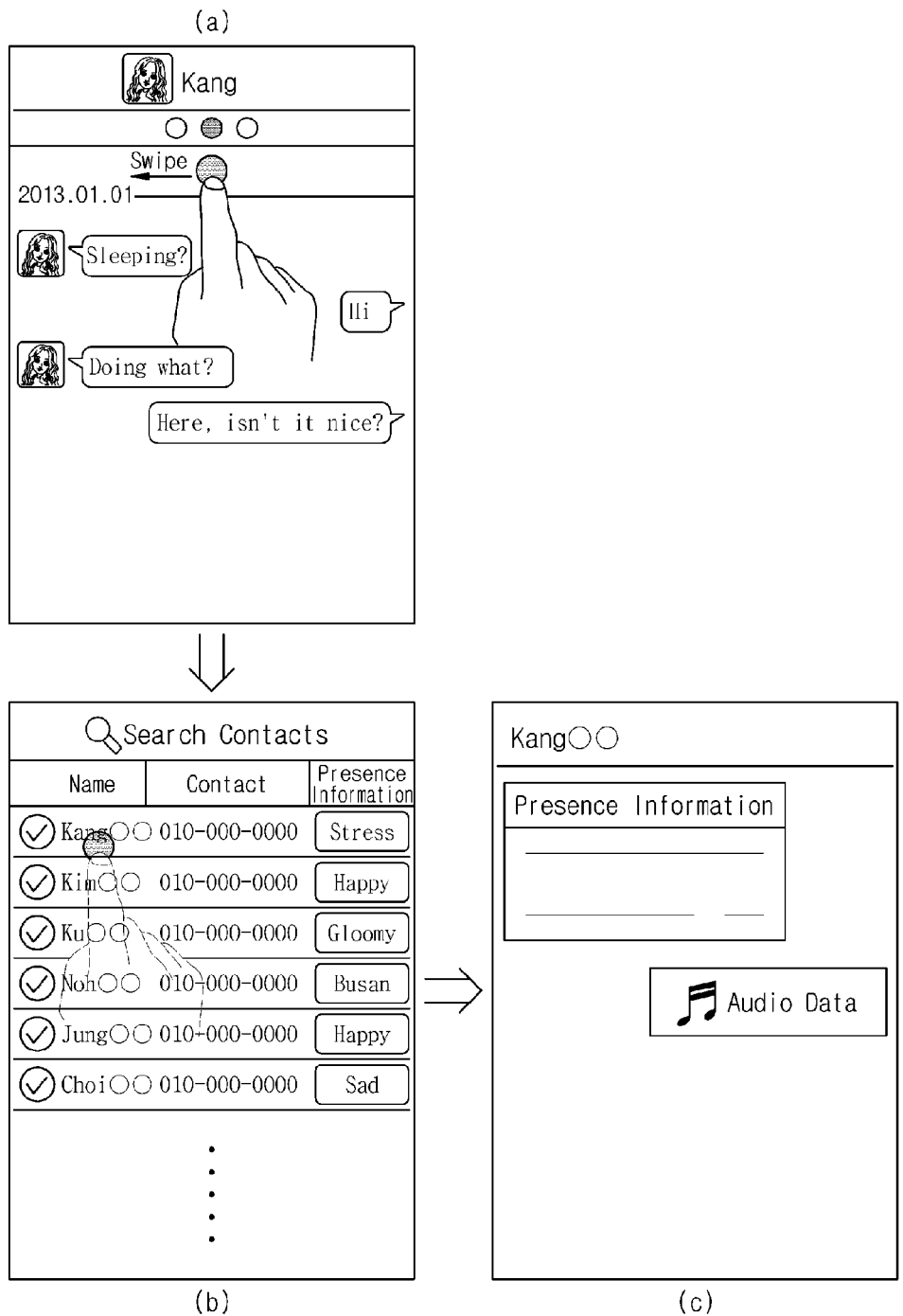
FIG. 10 shows exemplary screenshots of a contact list and a present information screen displayed in response to a detection of predetermined input information in a terminal device in accordance with another embodiment of the present invention.

Next, in step 2208, the second control unit 250 may check if the swipe input information entered by the user is detected or not, and, if not, will keep checking. If the swipe input information is detected, in step 2209, the second control unit 250 may run a presence application, and, in step 2210, as illustrated in FIG. 10, will display, on a certain spot of the current screen or on other screen, the user list and the icons for expressing presence information and audio information (e.g.

name of music, main photo of music album, background music, etc.) together with user profile information to which the icons are mapped. At this time, the second control unit 250, if a user would select the address book out of categories of the user list when determining presence function, may allow the users in the address book to be displayed on the user list. And if messenger service is currently available, the second control unit 250 may allow other users, who currently participate in chatting, to be displayed on the user list, and to have access to the address book or groups set up by the user. To this end, the second output unit 220 may display, on the user list screen, menu for accessing to the address book or groups.

Accordingly, in step 2211, the second control unit 250 checks if the user would select other user in the user list. Once other user is selected, in step 2212, the second control unit 250 may control the detailed presence information and audio data to be displayed on a certain spot of the current screen or on other screen. Then, as illustrated in FIG. 10, the second control unit 220 may display the detailed presence information and audio data, and will output the audio data to express the presence information of the selected user.

In embodiments as described above, the second control unit 220 may be implemented when only one other user in the user list is selected, and when a number of other users are selected, only presence information and audio data will be displayed on a screen, and the audio data is not to be displayed or may be displayed in the predetermined order set by the user.

Meanwhile, according to embodiments of the present invention, the second terminal device 200 may generate a recommendation message including the information for the purpose of recommending the presence information and the corresponding audio data to express the current state of the first terminal device 100, and can send the generated message to the terminal device of an acquaintance.

Also, according to embodiments of the present invention, the second terminal device 200 may generate a gift message including the presence information for expressing the current state of other user and the corresponding audio data, or coupons for purchasing the audio data, and can send the generated gift message to the terminal device of an acquaintance.

Accordingly, the second terminal device 200 may recommend or present a favorite music or an acquaintance's preferred audio data to the acquaintance and can share. According to embodiments of the present invention as described above, the presence information can be provided, using audio data instead of simple text, and accordingly, users should be able to gain a new experience (UX) wherein the users can perceive the presence information more intuitively.

The system for providing presence information in accordance with the present invention may be implemented in the form of software being readable through a variety of computer means and be recorded in any computer-readable medium. Here, this medium may contain, alone or in combination, program instructions, data files, data structures, and the like. These program instructions recorded in the medium may be specially designed and constructed for the present invention or well known to persons in the field of computer software. For example, the medium includes hardware devices specially configured to store and execute program instructions, including magnetic media such as a hard disk, a floppy disk and a magnetic tape, optical media such as CD-ROM (Compact Disk Read Only Memory) and DVD (Digital Video Disk), magneto-optical media such as floptical disk, ROM, RAM (Random Access Memory), and flash memory. Program instructions may include machine language codes made by a complier and high-level language codes executable in a computer using an interpreter or the like. These hardware devices may be configured to operating as one or more of software to perform the operation of this invention, and vice versa.

Though the present invention may include the details of a number of specific embodiments, these details should not be understood as limited to any invention or claims thereof, but be understood as an explanation about the features peculiar to the specific form of implementation of the specific invention. The specific features described in the context of the respective implementations in this specification, can be embodied by a combination in the single form of implementation. On the contrary, a variety of features described in the context of the single form of implementation, can also be embodied in the plural form of implementation, respectively or by the coherent sub-combination. Moreover, though the features can be described as operating by a specific combination or such as shown in claims, one or more of the features in the claimed combination can be, in some case, excluded from the combination, and the claimed combination can be changed to a sub-combination or a variation of the sub-combination.

Likewise, though the operations are described in the specific order in the drawings, it does not mean that, in order to obtain the desirable results, such operations should be carried out according to the specific order or to the sequential order as illustrated, or all of the illustrated operations should be carried out. In specific case, multi-tasking and parallel-processing would be more advantageous. Also, the separation of the various system components in the implementation as described above, should not be understood as being requested for all implementations and it should be noted that the program components or the system components could be generally integrated in a single software product or packaged in the multiple software products.

While this invention has been particularly shown and described with reference to an exemplary embodiment thereof, it will be understood by those skilled in the art that various changes in form and details may be made therein without departing from the subject matter of the invention. Specific terms used in this disclosure and drawings are used for illustrative purposes and not to be considered as a limitation of the present invention.

INDUSTRIAL APPLICABILITY

The present invention relates to a system, device, and method for providing presence information using audio data, comprising: a first terminal device configured to generate a setting request message requesting for determining the presence information and the corresponding audio data; a service device configured to store the presence information and the corresponding audio data according to the setting request message, to receive, from a second terminal device, an information request message requesting for the presence information of the first terminal device, and to transmit the presence information and the corresponding audio data to the second terminal device; a second terminal device configured to send an information request message, and to receive and output the presence information and the corresponding audio data. Thus, the present invention, when providing presence information, may utilize the audio data instead of the conventional use of text. For example, the presence information such as location, mood, state of being busy, etc. can be provided through audio data. Accordingly, the users should be able to gain a new user experience (UX) wherein the users could perceive the presence information of other users more intuitively. Therefore, the present invention will provide not only a good opportunity for marketing and sales in the marketplace, but also a good industrial applicability as the invention can actually be realized for implementation to a degree.

What is claimed is:

1. A terminal device for providing presence information by communicating with a service device, the terminal device comprising:
    a communication unit configured to send and receive messages in association with presence information, to and from the service device;
    an output unit configured to output at least one of auditory information and visual information; and
    a control unit, which is functionally connected with the communication unit and the output unit, configured to control the output unit to display a user list when predetermined input information is detected from a screen of an instant messaging program,
    wherein the user list contains user information about at least one of other users,
    wherein the user information includes
        profile information identifying the at least one of other users,
        presence information indicating a current state of the at least one of other users, and
        audio information defining audio data in association with the presence information, and
    wherein the audio data is defined by at least one of the service device and a terminal device of the at least one of other users.

2. The terminal device of claim 1, wherein, when one of other users is selected from the user list, the control unit is further configured to control the output unit to output audio data defined in association with the present information of the selected user.

3. The terminal device of claim 1, wherein the predetermined input information is information about a swipe input in a certain direction.

4. The terminal device of claim 1, wherein the predetermined input information is information about a shake input entered through a shake menu or on a chatting screen.

5. The terminal device of claim 1, wherein the user list contains all or part of other users stored in an address book in the terminal device.

6. The terminal device of claim 1, wherein the profile information includes at least one of name, contact information, photo, and email address of the at least one of other users.

7. The terminal device of claim 1, wherein the control unit is further configured to control the communication unit to receive, from the service device, the presence information and the audio information.

8. The terminal device of claim 1, wherein the control unit is further configured to control the output unit to display the user list on a certain spot of a current screen or on another screen.

9. The terminal device of claim 1, wherein the control unit is further configured to define, as audio information thereof, audio data associated with presence information for expressing a current state of a user of the terminal device.

10. The terminal device of claim 1, wherein the control unit is further configured to define, as background music of a chatting screen, the audio data associated with the presence information for expressing the current state of the at least one of other users.

11. The terminal device of claim 1, wherein the control unit is further configured
    to generate a recommendation message which contains information of recommending the audio data associated with the presence information for expressing the current state of the at least one of other users, and
    to send the generated message to other terminal devices.

12. The terminal device of claim 1, wherein the control unit is further configured
to generate a gift message which contains
the audio data associated with the presence information for expressing the current state of the at least one of other users, or
a coupon for purchasing the audio data, and
to send the generated gift message to other terminal devices.

13. The terminal device of claim 1, wherein the control unit is further configured to, when displaying the user list, compose icons to indicate the presence information and the audio information of each of other users in the user list, and to control the output unit to display the composed respective icons corresponding to the each of other users.

14. The terminal device of claim 1, wherein, when the presence information indicates a location, the audio data includes music to express the location.

15. The terminal device of claim 1, wherein, when the presence information indicates a mood, the audio data includes music to express the mood.

16. The terminal device of claim 1, wherein, when the presence information indicates a state of being busy, the audio data includes tempo information which is proportionate to the state of being busy.

17. A terminal device for providing presence information by communicating with a service device, the terminal device comprising:
a communication unit configured to send and receive messages in association with presence information to and from the service device;
an output unit configured to output at least one of auditory information and visual information; and
a control unit configured
to, in response to a detection of predetermined input information, display a user list,
to receive from the service device presence information and audio information associated with the presence information of a user selected from the displayed user list, and
when the received presence information and audio information are displayed through the output unit, to control the output unit to implement audio data contained in the audio information,
wherein the user list contains user information about at least the selected user,
wherein the user information includes
profile information identifying the selected user, and
the audio information in which the audio data associated with the presence information for expressing a current state of the selected user is defined, and
wherein the audio data is defined by at least one of the service device and a terminal device of the selected user.

18. A service device, comprising:
a communication module configured
to receive, from a first terminal device, a setting request message requesting presence information and audio data associated with the presence information to be defined, and
to receive, from a second terminal device, an information request message requesting the presence information of the first terminal device; and
a control module configured
to store, in response to the setting request message, the presence information of the first terminal device and the audio data associated with the presence information of the first terminal device, and
to transmit, in response to the information request message, the stored presence information of the first terminal device and audio information in which the audio data is defined in association with the presence information, to the second terminal device,
wherein the audio data is defined by the first terminal device.

19. The service device of claim 18, wherein the control module is further configured to, when receiving the setting request message from the first terminal device, define presence information of the first terminal device, to search for audio data to express the defined presence information, and to store after mapping the searched audio data to the defined presence information.

20. A system for providing presence information, the system comprising:
a first terminal device;
a second terminal device; and
a service device configured
to communicate with the first and second terminal devices,
when receiving a presence setting request from the first terminal device, to store presence information of the first terminal device and audio data associated with the presence information, and
when receiving a presence information request from the second terminal device requesting the presence information of the first terminal device, to transmit to the second terminal device the requested presence information and audio information in which the audio data associated with the requested presence information is defined;
wherein the second terminal device is configured, when detecting predetermined input information from a screen of an instant messaging program, to display a user list which contains information about at least a first user of the first terminal device,
wherein the information about the first user includes
profile information identifying the first user,
the requested presence information indicating a current state of the first user, and
the audio information in which the audio data associated with the requested presence information is defined, and
wherein the audio data is defined by at least one of the service device and the first terminal device.

21. A method for providing presence information in a terminal device, the method comprising:
detecting predetermined input information from a screen of an instant messaging program;
when the predetermined input information is detected, displaying a user list containing user information about at least one of other users; and
when the at least one of other users is selected from the displayed user list, outputting presence information of the selected user and audio data defined in association with the presence information,
wherein the audio data is defined by at least one of a service device and a terminal device of the selected user.

22. The method of claim 21, wherein the user information includes
profile information identifying the at least one of other users,
presence information indicating a current state of the at least one of other users, and
audio information in which audio data associated with the requested presence information is defined.

23. The method of claim 21, further comprising:
receiving, from the service device, the presence information of the selected user and the audio data defined in association with the presence information.

24. The method of claim 21, further comprising:
defining the presence information of the terminal device;
defining audio data associated with the defined presence information; and
sending the defined presence information and the defined audio data to the service device.

25. A non-transitory computer-readable medium recording thereon a program executing a method for providing presence information in a terminal device, the method comprising:
detecting predetermined input information from a screen of an instant messaging program;
when the predetermined input information is detected, displaying a user list containing user information about at least one of other users; and
when the at least one of other users is selected from the displayed user list, outputting presence information of the selected user and audio data defined in association with the presence information,
wherein the audio data is defined by at least one of a service device and a terminal device of the selected user.

* * * * *